(12) United States Patent
Yamazaki et al.

(10) Patent No.: US 7,535,902 B2
(45) Date of Patent: May 19, 2009

(54) TRAFFIC DISTRIBUTION DEVICE, TRAFFIC DISTRIBUTION METHOD AND PACKET RELAY METHOD

(75) Inventors: Takeshi Yamazaki, Kawasaki (JP); Naohiko Takamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 536 days.

(21) Appl. No.: 11/221,189

(22) Filed: Sep. 7, 2005

(65) Prior Publication Data
US 2006/0221973 A1 Oct. 5, 2006

(30) Foreign Application Priority Data
Mar. 30, 2005 (JP) ............................. 2005-096983
Jun. 23, 2005 (JP) ............................. 2005-183543

(51) Int. Cl.
*H04L 12/28* (2006.01)
(52) U.S. Cl. ........................ 370/389; 370/351; 709/232
(58) Field of Classification Search ........................ None
See application file for complete search history.

(56) References Cited

U.S. PATENT DOCUMENTS

| | | | | |
|---|---|---|---|---|
| 6,801,949 | B1 * | 10/2004 | Bruck et al. ................. | 709/232 |
| 6,987,763 | B2 * | 1/2006 | Rochberger et al. ......... | 370/389 |
| 7,379,458 | B2 * | 5/2008 | Inoue et al. ................. | 370/392 |
| 7,454,503 | B2 * | 11/2008 | Childress et al. ............ | 709/226 |
| 2003/0108052 | A1 * | 6/2003 | Inoue et al. ................. | 370/399 |
| 2005/0108407 | A1 * | 5/2005 | Johnson et al. ............. | 709/228 |
| 2008/0104273 | A1 * | 5/2008 | Bruck et al. ................ | 709/238 |

FOREIGN PATENT DOCUMENTS

JP 11-027320 1/1999

* cited by examiner

*Primary Examiner*—Phirin Sam
(74) *Attorney, Agent, or Firm*—Fujitsu Patent Center

(57) ABSTRACT

Disclosed is a traffic distribution device, which is used in a way that connects to a 0-th network, a first network including one or more servers and to a second network connected to the first network and including M-pieces of high-order layer processing devices associated with 0 through M-1, capable of improving a throughput of a network without changing a server sided default gateway address. The traffic distribution device has first packet relay unit translating a packet containing a predetermined destination IP address from the 0-th network into a packet in which a destination MAC address is set as a first network sided MAC address of the high-order layer processing device, which MAC address is associated with a remainder value obtained by dividing a source IP address of the packet by M, and transmitting this packet onto the first network; and second packet relay unit translating the packet from the second network into a packet in which a destination MAC address is a second network sided MAC address of the high-order layer processing device, which MAC address is associated with a remainder value obtained by dividing the destination IP address of the packet by M, and transmitting this packet onto the second network.

5 Claims, 7 Drawing Sheets

DEFINITION INFORMATION  20

| LAN 1 NETWORK ADDRESS | VIP1 | LAN 2 NETWORK ADDRESS | LAN 2 DEFAULT GW ADDRESS |
|---|---|---|---|
| 10.1.1.0/24 | 10.1.1.1 | 10.1.2.0/24 | 10.1.2.1 |

| NODE NUMBER | DISTRIBUTION TYPE | SOURCE IP INFORMATION | LAN 1 SIDED IP ADDRESS | LAN 2 SIDED IP ADDRESS |
|---|---|---|---|---|
| 1 | DYNAMIC | | 10.1.1.10 | 10.1.2.10 |
| 2 | DYNAMIC | | 10.1.1.11 | 10.1.2.11 |
| 3 | DYNAMIC | | 10.1.1.12 | 10.1.2.12 |

FIG.5A

| NODE NUMBER | REMAINDER VALUE | LAN 1 SIDED IP ADDRESS | LAN 1 SIDED MAC ADDRESS | LAN 2 SIDED IP ADDRESS | LAN 2 SIDED MAC ADDRESS |
|---|---|---|---|---|---|
| 1 | 0 | 10.1.1.10 | | 10.1.2.10 | |
| 2 | 1 | 10.1.1.11 | | 10.1.2.11 | |
| 3 | 2 | 10.1.1.12 | | 10.1.2.12 | |

FIG.5B

| SOURCE IP ADDRESS | NODE NUMBER | LAN 1 SIDED IP ADDRESS | LAN 1 SIDED MAC ADDRESS | LAN 2 SIDED IP ADDRESS | LAN 2 SIDED MAC ADDRESS |
|---|---|---|---|---|---|
| xxx.xxx.xxx.xxx | 4 | 10.1.1.13 | | 10.1.2.13 | |

SERVERS VIRTUALIZED BY VIP 1
DEFAULT GATEWAY : IP 11

TRAFFIC DISTRIBUTION DEVICE, TRAFFIC DISTRIBUTION METHOD AND PACKET RELAY METHOD

BACKGROUND OF THE INVENTION

1. Field of the Invention

The present invention relates to a traffic distribution device, a traffic distribution method and a packet relay method.

2. Related Background Art

Figure 9:
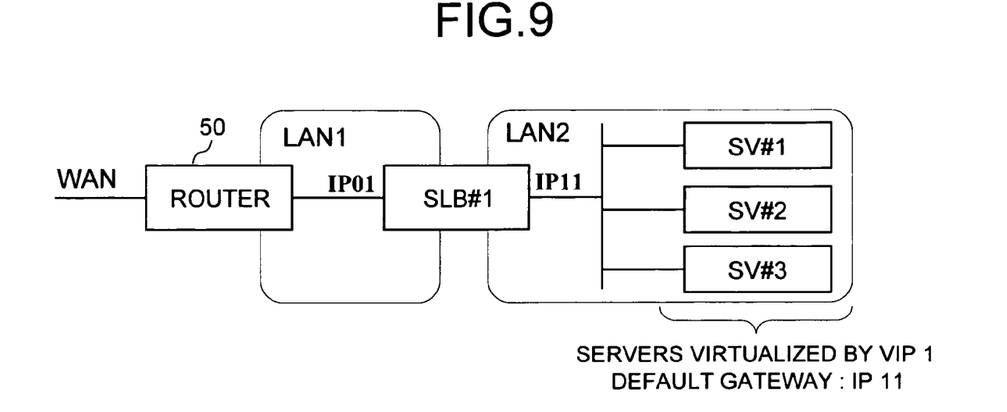
FIG. 9 is an explanatory view showing a network using a conventional high-order layer processing device.

As known well, over the recent years, as schematically shown in FIG. 9, networks (LAN 1 and LAN 2) including a plurality of servers (SV #1-SV #3 in FIG. 9) each having the same function and the same configuration and a server load balancer (SLB #1: refer to, e.g., Patent document 1), have come to link to WAN and the Internet via a router 50.

A throughput of the network having the architecture given above is determined by a high-order layer processing device such as the server load balancer requiring softwarewise processing. Therefore, a scheme performed for improving the throughput of the network using the existing high-order layer processing device (the server load balancer, a firewall, etc.) is that the high-order layer processing device is replaced by a device having a higher function.

Moreover, there is a limit to the throughput attainable by the single high-order layer processing device. Hence, definitions pertaining to the network architecture are changed for desiring to gain a throughput equal to or higher than the throughput attainable by the single high-order layer processing device.

Namely, in the case of simply adding SLB #2 to this network (FIG. 9), a server sided default gateway address of the SLB #1 is IP 11, and consequently there is acquired the network, wherein the servers SV #1-SV #3 send responses to requests given from any SLBs to the SLB #1. Therefore, in the case of desiring to gain the throughput equal to or higher than the throughput attainable by the single high-order layer processing device, the definitions about the network architecture are changed.

[Patent document 1] Japanese Patent Application Laid-Open Publication No. 11-27320

SUMMARY OF THE INVENTION

Such being the case, it is an object of the present invention to provide a traffic distribution device, a traffic distribution program and a packet relay method that are capable of improving a throughput of a network without changing definitions pertaining to an existing network architecture (without changing a server sided default gateway address).

To accomplish the above object, according to one aspect of the present invention, a traffic distribution device is a device used in a way that connects to a 0-th network, a first network including one or more servers and to a second network connected to the first network and including M-pieces of high-order layer processing devices associated with 0 through M-1, comprising first packet relay means translating, each time a packet in which a predetermined destination IP address is set, is received from the 0-th network, this packet into a packet in which a destination MAC address is set as a first network sided MAC address of the high-order layer processing device, which MAC address is associated with a remainder value obtained by dividing a source IP address of the packet by M, and transmitting this packet onto the first network; and second packet relay means translating, each time the packet is received from the second network, this packet into a packet in which a destination MAC address is a second network sided MAC address of the high-order layer processing device, which MAC address is associated with a remainder value obtained by dividing the destination IP address of the packet by M, and transmitting this packet onto the second network.

Namely, the traffic distribution device according to the present invention has a configuration enabling a high-order layer processing device (server load balancer etc.) incapable of juxtaposing to operate as a device capable of juxtaposing. Accordingly, the use of the traffic distribution device of the present invention makes it possible to gain a desired throughput of the network by a well-performance method that is as simple as adding several high-order layer processing devices to the existing network.

On the occasion of actualizing the traffic distribution device according to the present invention, the second network can be set as a network including K-pieces of second type high-order layer processing devices each associated with several source IP addresses, the first packet relay means can be set as means for translating, if the source IP address of the packet in which the predetermined destination IP address received from the 0-th network is set is a source IP address associated with any one of the K-pieces of second type high-order layer processing devices, the received packet into a packet in which the destination MAC address is a first network sided MAC address of the second type high-order layer processing device associated with the source IP address thereof, and transmitting this packet onto the first network, and the second packet relay means can be set as means for translating, if the destination IP address of the packet received from the 0-th network is coincident with a source IP address associated with any one of the K-pieces of second type high-order layer processing devices, the received packet into a packet in which the destination MAC address is a second network sided MAC address of the second type high-order layer processing device that is coincident with the source IP address thereof, and transmitting this packet onto the second network.

Note that in the case of desiring to actualize the traffic distribution device of the present invention in this configuration (and desiring to associate each of the second type high-order layer processing devices with IP addresses of several proxy servers), it is possible to actualize the network in which requests from the proxy servers do not concentrate at the single high-order layer processing device.

According t another aspect of the present invention, a traffic distribution program of the present invention is capable of making a computer operate as a device equal to the traffic distribution device (as set forth in claim 1) of the present invention. Hence, the use of the traffic distribution program of the present invention also makes it possible to gain the desired throughput of the network by the well-performance method that is as simple as adding several high-order layer processing devices to the existing network.

According to a further aspect of the present invention, a packet relay method comprises translating, each time a packet in which a predetermined destination IP address is set, is received from said 0-th network, this packet into a packet in which a destination MAC address is set as a first network sided MAC address of said high-order layer processing device, which MAC address is associated with a remainder value obtained by dividing a source IP address of the packet by M, and transmitting this packet onto said first network, and translating, each time the packet is received from said second network, this packet into a packet in which a destination MAC address is a second network sided MAC address of said high-order layer processing device, which MAC address is associated with a remainder value obtained by dividing the destination IP address of the packet by M, and transmitting this packet onto said second network, whereby a packet is relayed between a 0-th network, a first network including one or more servers and a second network connected to said first network and including M-pieces of high-order layer processing devices associated with 0 through M-1. Accordingly, the use of the packet relay method makes it possible to gain the desired throughput of the network in a well-performance configuration as simply as adding several high-order layer processing devices to the existing network.

The use of each of the traffic distribution device, the traffic distribution program and the packet relay method makes it possible to improve the throughput of the network employing the high-order layer processing devices by the well-performance method that is as simple as increasing the number of the high-order layer processing devices without changing the definition of the server in the existing network architecture (without changing a default gateway on the server side).

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENT

An in-depth description of a best mode for carrying out the present invention will hereinafter be made with reference to the drawings.

Figure 1:
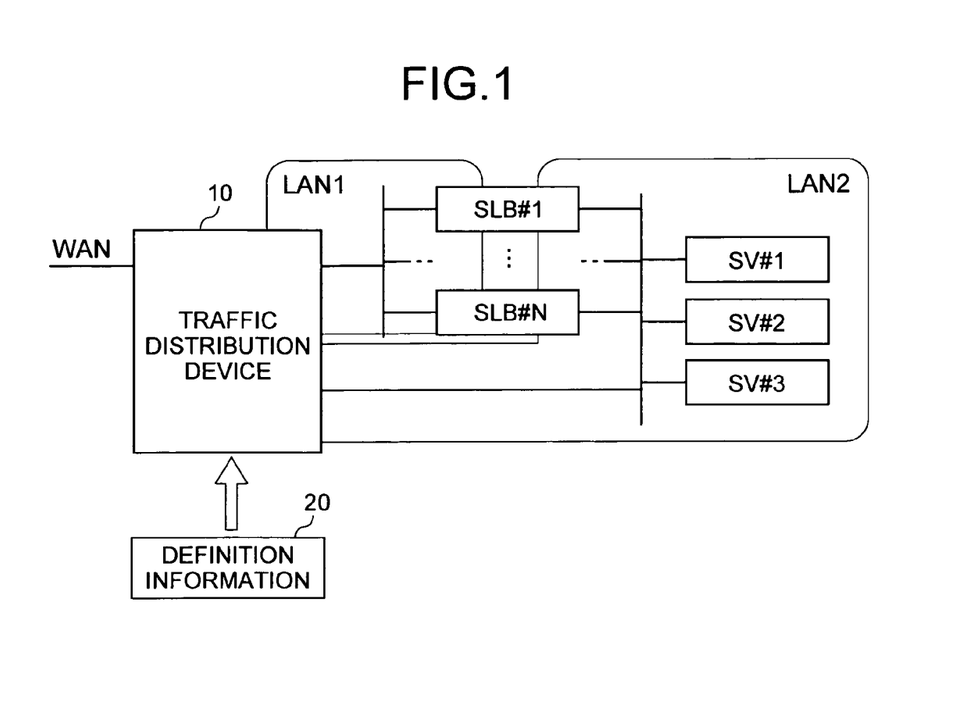
FIG. 1 is an explanatory view showing a usage mode of a traffic distribution device according to one embodiment of the present invention.

As schematically shown in FIG. 1, a traffic distribution device 10 according to one embodiment of the present invention is a device used by connecting to a LAN 1 (corresponding to a first network according to the present invention) including N-pieces of SLBs (Server Load Balancers) #1-#N, to a LAN 2 (corresponding to a second network according to the present invention) including a plurality (three pieces in FIG. 1) of SVs (Servers) etc., and to a WAN (corresponding to a 0-th network according to the present invention). The traffic distribution device 10 is also a device of such a type that an administrator etc. must set definition information 20.

Note that the traffic distribution device 10 according to the present embodiment is also a device (capable of connecting the WAN to a LAN 3 etc.) including a port for connecting to a normal LAN (other than the LAN 1 and the LAN 2).

This traffic distribution device 10 is employed as a substitute for a router 50 when there arises a necessity of improving a throughput of the network [configured by the SLB #1 and the plurality of servers (SV #1-SV #3 in FIG. 9)] having an architecture as illustrated in FIG. 9.

Figure 2:
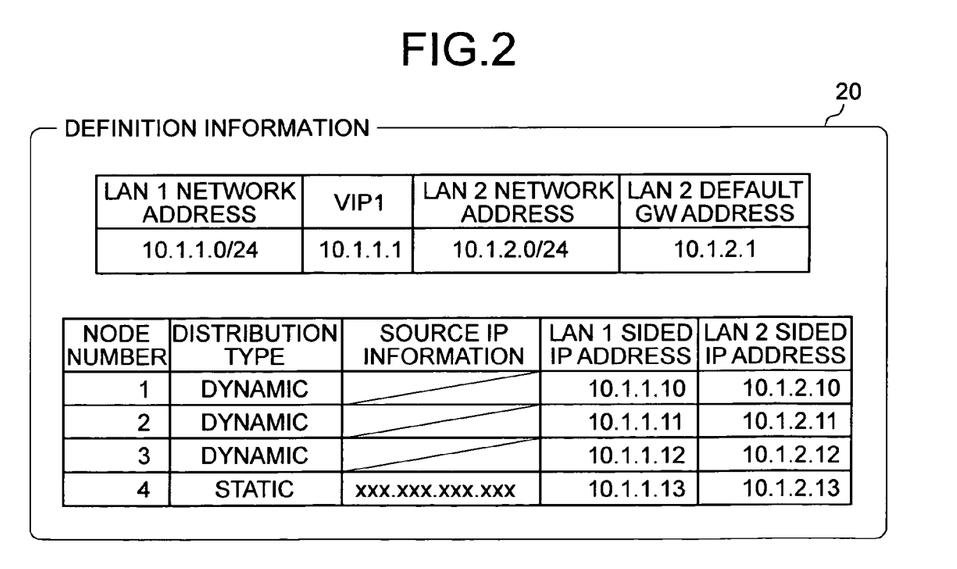
FIG. 2 is an explanatory diagram showing definition information set in the traffic distribution device according to the embodiment.
Figure 3:
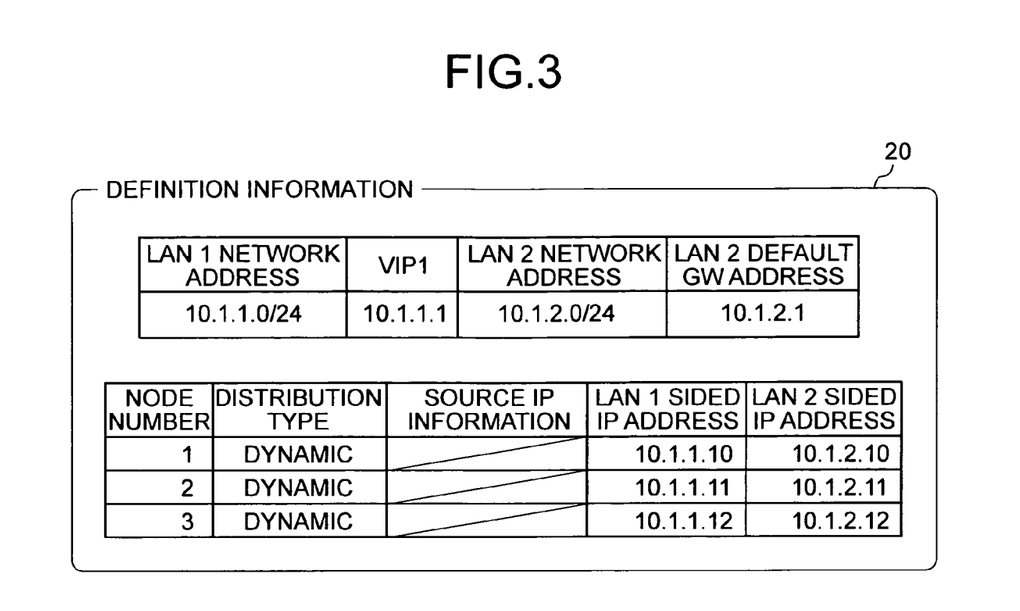
FIG. 3 is an explanatory diagram showing the definition information set in the traffic distribution device according to the embodiment.

The definition information 20 (that must be set in the traffic distribution device 10 by the administrator etc.) has contents as schematically shown in FIGS. 2 and 3.

To be specific, the definition information 20 contains a network address of the LAN 1, a virtual IP address VIP 1 (this virtual IP address appears to be a server address from the WAN side (the individual addresses such as SV#1 etc. appear to be shielded)), a network address of the LAN 2 and a default gateway address of the LAN 2 (SV#1-SV#3). Further, the definition information 20 contains, for every SLB connected to the traffic distribution device 10, the LAN 1 sided IP address of the SLB, the LAN 2 sided IP address of the SLB, and a distribution type (indicating "static"/"dynamic" distinctively; details will be explained later on), wherein as for the SLB (see FIG. 2) with setting of "static" entered as the distribution type, a value in the source IP information consists of one or more IP address.

Figure 4:
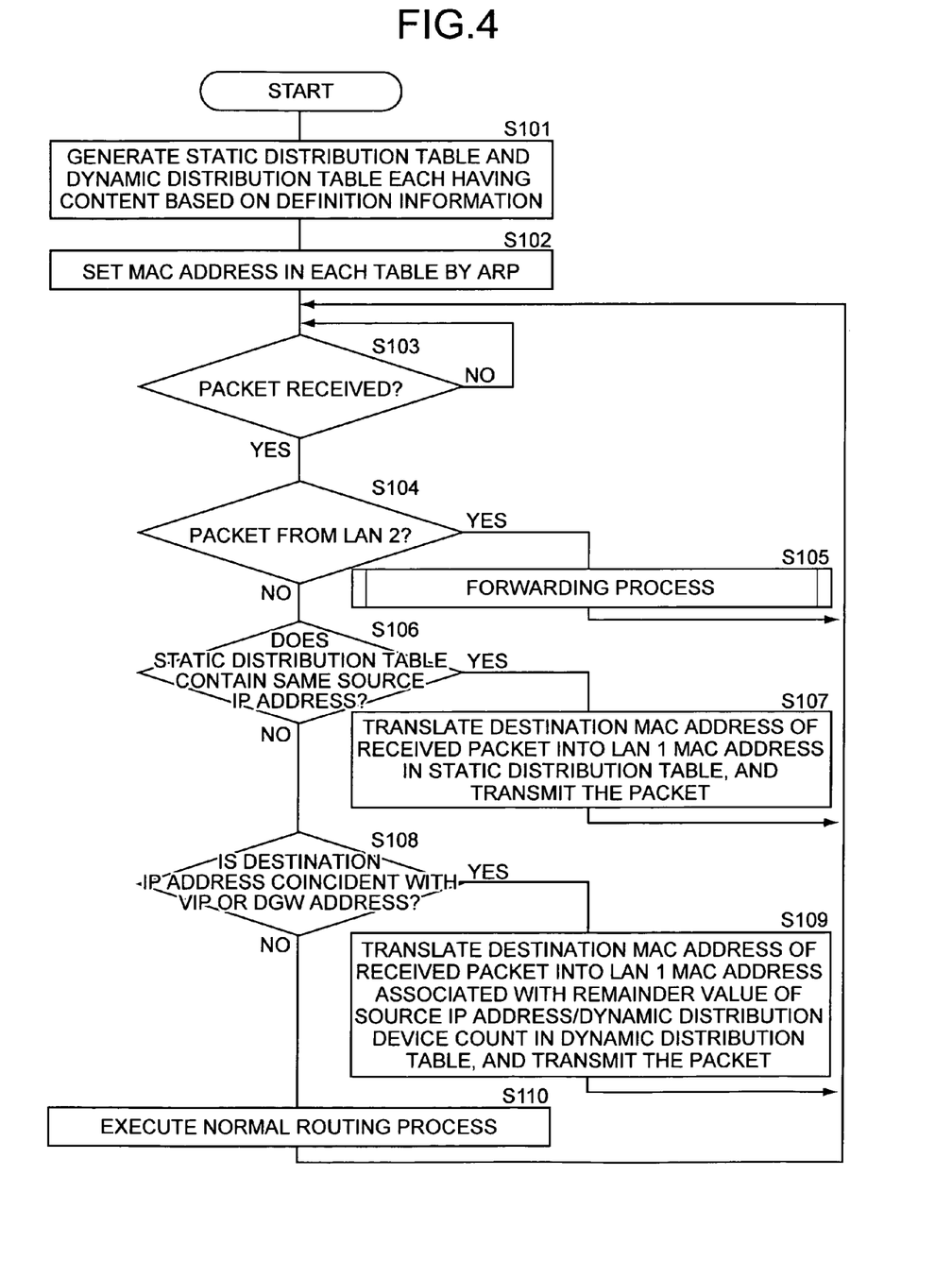
FIG. 4 is a flowchart of processes executed by the traffic distribution device according to the embodiment.

Then, the traffic distribution device 10 according to the present embodiment, upon setting of the definition information 20, starts processing in a procedure shown in FIG. 4.

Namely, the traffic distribution device 10, in which the definition information 20 is set, at first executes a process (S101) of generating a dynamic distribution table and a static distribution table having contents conforming with the definition information 20 on the memory. Further, the traffic distribution device 10 also executes in this step S101 a process of reading the LAN 1 address and the VIP 1 in the definition information 20 onto the memory, and a process of storing an information count of the information with "dynamic" set in the distribution type as a dynamic distribution device count on the memory.

Figure 5A:
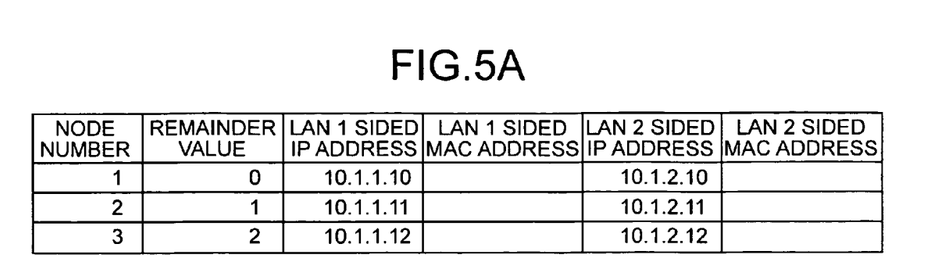
FIG. 5A is an explanatory diagram showing a dynamic distribution table generated in the traffic distribution device according to the embodiment.
Figure 5B:
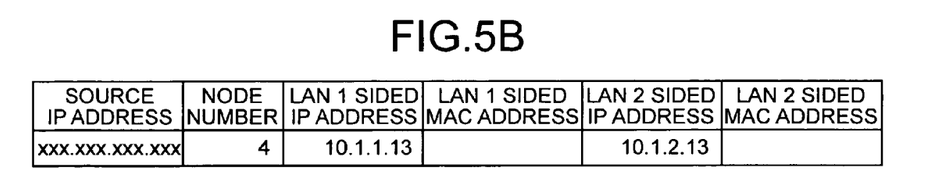
FIG. 5B is an explanatory diagram showing a static distribution table generated in the traffic distribution device according to the embodiment.

If the set definition information 20 comes to have the content shown in FIG. 2, the dynamic distribution table and the static distribution table generated when executing the process in step S101 have structures as shown in FIGS. 5A and 5B.

In short, the dynamic distribution table is generated from the information about the respective SLBs with "dynamic" entered in the distribution type (and a dynamic SLB count) in the definition information 20. Further, the static distribution table is generated from the information about the respective SLBs with "static" entered in the distribution type in the definition information 20. The static distribution table generated in the case of the definition information 20 having the content shown in FIG. 3 is null in content.

The traffic distribution device 10 finishing the process in step S101 (FIG. 4) executes a process (S102) of gasping MAC (Media Access Control) addresses of the devices (SLBs) having the IP addresses in the generated tables on the basis of ARP (Address Resolution Protocol), and setting the thus-grasped MAC addresses in the respective tables.

Then, the traffic distribution device 10 comes to a status of executing a loop process in steps S103 through S110.

Namely, the traffic distribution device 10 waits for a packet to be received (step S103), and, when receiving the packet from the WAN side (step S103; YES, step S104; NO), judges whether or not the static distribution table (FIG. 5B) is stored with the same source IP address as the source IP address of the received packet (step S106).

Figure 6:
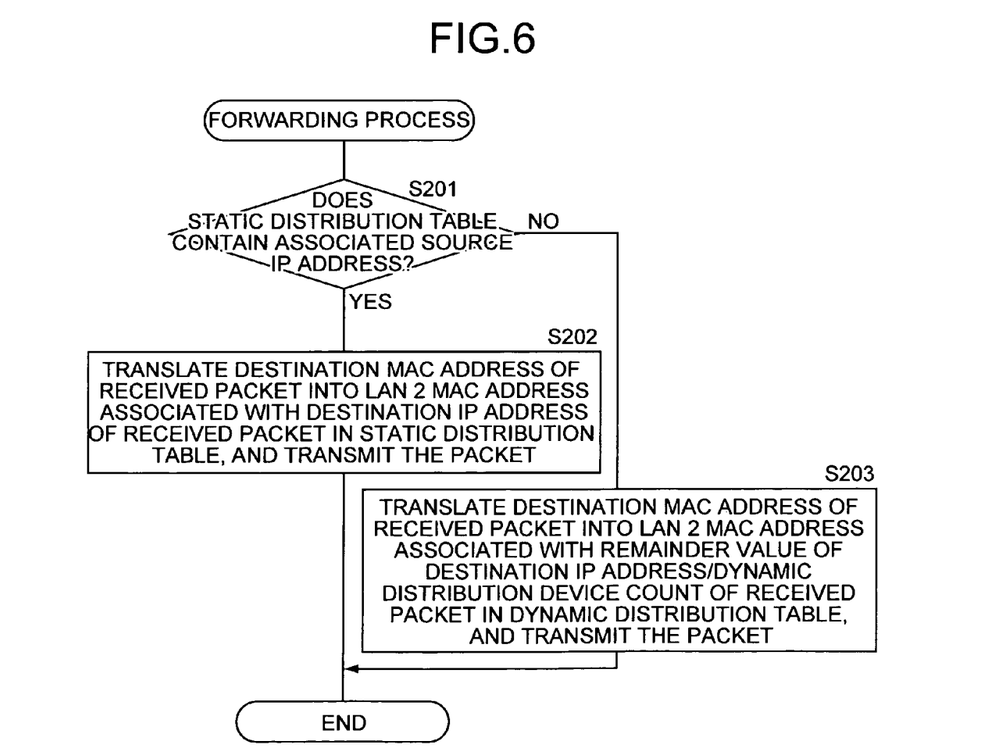
FIG. 6 is a flowchart of a forwarding process executed in the processes shown in FIG. 4.

If the static distribution table is not stored with the same source IP address as the source IP address of the received packet (step S106; NO), the traffic distribution device 10 judges which address, the VIP 1 or the default gateway address, a destination IP address in the received packet is coincident with (step S108). If the destination IP address in the received packet is coincident with the VIP 1 (step S108; YES), the traffic distribution device 10 executes a process of rewriting (translating) the destination MAC address of the received packet into the LAN 1 sided MAC address associated with a remainder value of "received packet source IP address/dynamic distribution device count" in the dynamic distribution table (FIG. 6A), and transmitting this MAC-address-translated packet onto the LAN 1 (step S109).

Whereas if the destination IP address in the received packet is not coincident with the VIP 1 (step S108; NO), the traffic distribution device 10 executes a normal routing process (step S110). Note that the traffic distribution device 10 executes the process in this step S110 in such a case that traffic distribution device 10 is connected to the LAN 3 (other than the LAN 1 and the LAN 2) and receives the packet addressed to the device on the LAN 3.

Further, the traffic distribution device 10, if the same source IP address as the source IP address of the received packet is stored in the static distribution table (step S106; YES), executes a process (step S107) of rewriting (translating) the destination MAC address of the received packet into the LAN 1 sided MAC address associated with the source IP address of the received packet in the static distribution table, and transmitting this MAC-address-translated packet onto the LAN 1.

Moreover, the traffic distribution device 10, when receiving the packet from the LAN 2 side (step S103; YES, step S104; YES), executes in step S105 a forwarding process having a content shown in FIG. 6.

To be specific, the traffic distribution device 10 judges (FIG. 6: step S201) whether or not the same address as the destination IP address of the received packet is stored as a source IP address in the static distribution table (FIG. 5B). Then, the traffic distribution device 10, if the same address as the destination IP address of the received packet is stored as the source IP address in the static distribution table (step S201; YES), executes a process (step S202) of rewriting (translating) the destination MAC address of the received packet into the LAN 2 sided MAC address associated with the destination IP address of the received packet in the static distribution table and transmitting this MAC-address-translated packet onto the LAN 2, and thereafter terminates this forwarding process.

Whereas if the same address as the destination IP address of the received packet is not stored as the source IP address in the static distribution table (step S201; NO), the traffic distribution device 10 executes a process (step S203) of rewriting (translating) the destination MAC address of the received packet into the LAN 2 sided MAC address associated with the remainder value in the "received packet destination IP address/dynamic distribution device count" in the dynamic distribution table (FIG. 5A) and transmitting this MAC-address translated packet onto the LAN 2, and thereafter terminates this forwarding process.

Then, the traffic distribution device 10 finishing the processes in steps S105, S107, S109 or S110 returns to the status of waiting for the packet to be received in step S103.

Figure 7:
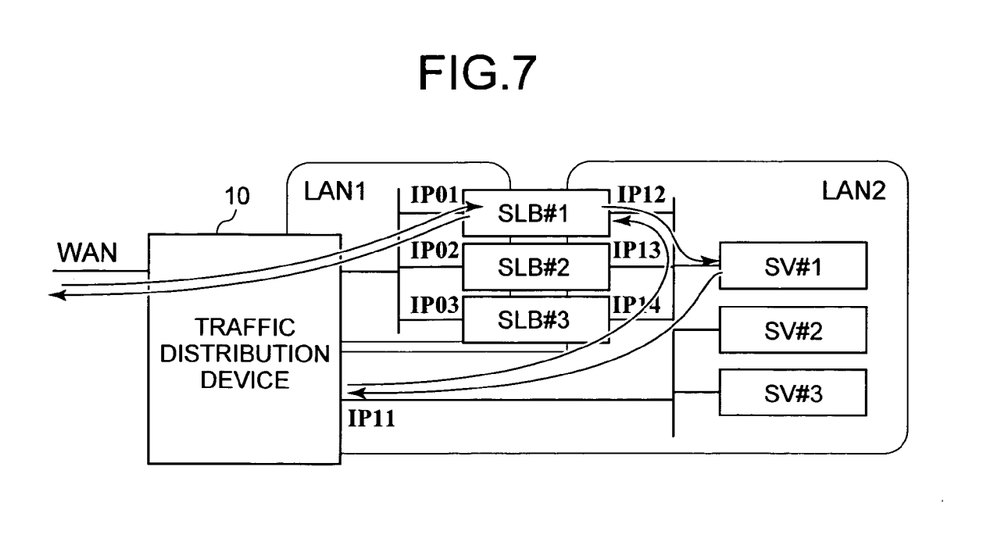
FIG. 7 is an explanatory diagram showing a packet transferring/receiving procedure in the network employing the traffic distribution device according to the embodiment.
Figure 8:
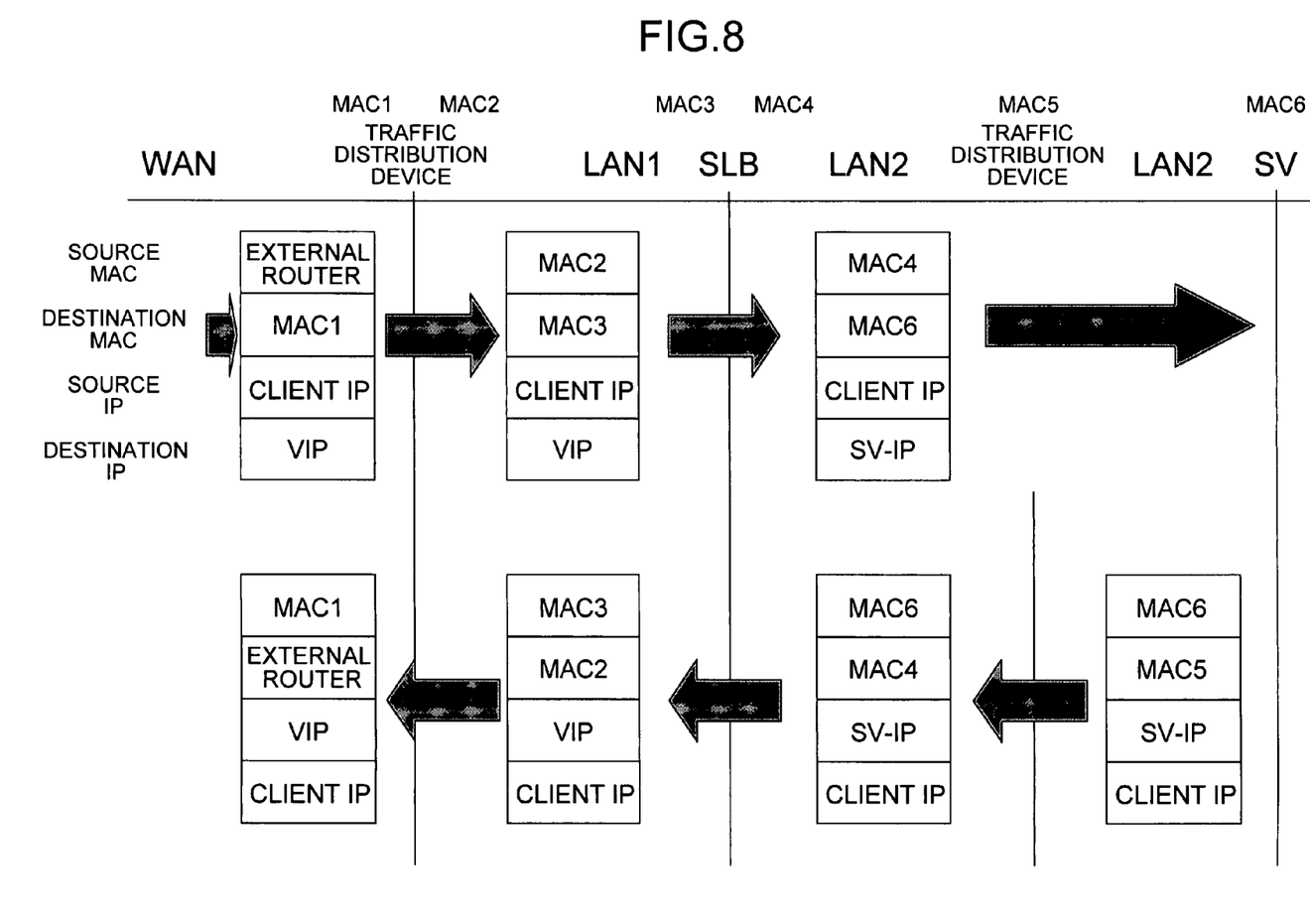
FIG. 8 is an explanatory diagram showing the packet transferring/receiving procedure in the network employing the traffic distribution device according to the embodiment.

As obvious from the description given above, in the network employing the traffic distribution device 10 according to the present embodiment, the packet is transferred and received in the configurations schematically illustrated in FIGS. 7 and 8. Note that MAC 1 and MAC 2 in FIG. 8 represent the WAN sided and LAN 1 sided MAC addresses of the traffic distribution device 10. MAC 3 is the LAN 1 sided MAC address (see FIG. 5A) of a certain SLB determined by the traffic distribution device 10 on the basis of the source IP address (received packet source IP address/dynamic distribution device count") of the received packet, and MAC 4 is the LAN 2 sided MAC address of this SLB. Further, MAC 5 is the LAN 2 sided MAC address (associated with IP 11) of the traffic distribution device 10, and MAC 6 is the MAC address of the server.

Thus, the traffic distribution device 10 according to the present embodiment has no necessity of changing the definition of the existing network architecture (changing the default gateway address on the server side) when employed. Accordingly, when using the present traffic distribution device 10, a desired throughput of the network can be attained in a simple configuration exhibiting well cost performance by adding several high-order layer processing devices to the existing network.

MODIFIED EXAMPLE

The aforementioned traffic distribution device 10 can be modified in variety of forms. For example, the scheme that the traffic distribution device 10 is configured to enable the setting of "static" as the distribution type intends to prevent the load of the specified SLB from rising due to the requests (the packets from a proxy server. Hence, in the case of manufacturing the traffic distribution device 10 to be employed under an environment where the request from the proxy server is not received (the number of requests from the proxy server is small), the processing function (of executing S106, S107, etc.) related to the static distribution table can be removed from the traffic distribution device 10.

Moreover, the process executed by the traffic distribution device 10 is as simple as translating the MAC address, and therefore a computer connectable to the WAN, the LAN 1 and the LAN 2 (the computer including, e.g., three pieces of network interface boards) is made to execute a program, whereby the same processes executed by the traffic distribution device 10 can be performed.

Further, it is taken for granted that the traffic distribution device 10 connected to the high-order layer processing device excluding the SLBs may be actualized based on the technologies utilized for the traffic distribution device 10 in the embodiment.

The present invention has been discussed by way of the embodiments but may be modified in many forms within the range of the gist of the present invention, and these modifications are not excluded from the scope of the present invention.

What is claimed is:

1. A traffic distribution device used in a way that connects to a 0-th network, a first network including one or more servers and to a second network connected to said first network and including M-pieces of high-order layer processing devices associated with 0 through M-1, comprising:

first packet relay means translating, each time a packet in which a predetermined destination IP address is set, is received from said 0-th network, this packet into a packet in which a destination MAC address is set as a first network sided MAC address of said high-order layer processing device, which MAC address is associated with a remainder value obtained by dividing a source IP address of the packet by M, and transmitting this packet onto said first network; and second packet relay means translating, each time the packet is received from said second network, this packet into a packet in which a destination MAC address is a second network sided MAC address of said high-order layer processing device, which MAC address is associated with a remainder value obtained by dividing the destination IP address of the packet by M, and transmitting this packet onto said second network.

2. A traffic distribution device according to claim 1, wherein said second network is a network including K-pieces of second type high-order layer processing devices each associated with several source IP addresses, said first packet relay means is means for translating, if the source IP address of the packet in which the predetermined destination IP address received from said 0-th network is set is a source IP address associated with anyone of said K-pieces of second type high-order layer processing devices, the received packet into a packet in which the destination MAC address is a first network sided MAC address of said second type high-order layer processing device associated with the source IP address thereof, and transmitting this packet onto said first network, and said second packet relay means is means for translating, if the destination IP address of the packet received from said 0-th network is coincident with a source IP address associated with any one of said K-pieces of second type high-order layer processing devices, the received packet into a packet in which the destination MAC address is a second network sided MAC address of said second type high-order layer processing device that is coincident with the source IP address thereof, and transmitting this packet onto said second network.

3. A traffic distribution device according to claim 1 or 2, wherein said high-order layer processing device is a server load balancer.

4. A traffic distribution program, when executed by a computer connected to a 0-th network, to a first network including one or more servers and to a second network connected to said first network and including M-pieces of high-order layer processing devices associated with 0 through M-1, causing said computer to operate as a device comprising:

first packet relay means translating, each time a packet in which a predetermined destination IP address is set, is received from said 0-th network, this packet into a packet in which a destination MAC address is set as a first network sided MAC address of said high-order layer processing device, which MAC address is associated with a remainder value obtained by dividing a source IP address of the packet by M, and transmitting this packet onto said first network; and second packet relay means translating, each time the packet is received from said second network, this packet into a packet in which a destination MAC address is a second network sided MAC address of said high-order layer processing device, which MAC address is associated with a remainder value obtained by dividing the destination IP address of the packet by M, and transmitting this packet onto said second network.

5. A packet relay method for relaying a packet between a 0-th network, a first network including one or more servers and a second network connected to said first network and including M-pieces of high-order layer processing devices associated with 0 through M-1, said method comprising:

translating, each time a packet in which a predetermined destination IP address is set, is received from said 0-th network, this packet into a packet in which a destination MAC address is set as a first network sided MAC address of said high-order layer processing device, which MAC address is associated with a remainder value obtained by dividing a source IP address of the packet by M, and transmitting this packet onto said first network; and translating, each time the packet is received from said second network, this packet into a packet in which a destination MAC address is a second network sided MAC address of said high-order layer processing device, which MAC address is associated with a remainder value obtained by dividing the destination IP address of the packet by M, and transmitting this packet onto said second network.

* * * * *

UNITED STATES PATENT AND TRADEMARK OFFICE
CERTIFICATE OF CORRECTION

| | |
|---|---|
| PATENT NO. | : 7,535,902 B2 |
| APPLICATION NO. | : 11/221189 |
| DATED | : May 19, 2009 |
| INVENTOR(S) | : Takeshi Yamazaki and Naohiko Takamura |

It is certified that error appears in the above-identified patent and that said Letters Patent is hereby corrected as shown below:

In Claim 2:

Column 7, Line 28: "anyone" should read --any one--.

Signed and Sealed this
Nineteenth Day of July, 2011

David J. Kappos
*Director of the United States Patent and Trademark Office*